（12）United States Patent
Noumura et al.

(10) Patent No.: US 9,002,578 B2
(45) Date of Patent: Apr. 7, 2015

(54) VEHICLE CONTROL SYSTEM

(75) Inventors: Shin Noumura, Yamato (JP); Kaiji Itabashi, Gotenba (JP); Toshio Tanahashi, Susono (JP); Keisuke Takeuchi, Susono (JP); Yoshimitsu Agata, Numadu (JP); Tomohide Kawasaki, Mishima (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/575,977

(22) PCT Filed: Jul. 20, 2011

(86) PCT No.: PCT/JP2011/066424
§ 371 (c)(1),
(2), (4) Date: Jul. 30, 2012

(87) PCT Pub. No.: WO2013/011572
PCT Pub. Date: Jan. 24, 2013

(65) Prior Publication Data
US 2014/0207334 A1    Jul. 24, 2014

(51) Int. Cl.
*B60G 17/018* (2006.01)
*B62C 3/00* (2006.01)
*G06F 19/00* (2011.01)
*B60W 50/08* (2012.01)
*F16H 61/10* (2006.01)
*B60W 40/09* (2012.01)

(52) U.S. Cl.
CPC ............ *B60W 50/082* (2013.01); *F16H 61/10* (2013.01); *B60W 40/09* (2013.01); *B60W 2520/105* (2013.01); *B60W 2520/125* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,826,209 | A * | 10/1998 | Matsuno | 701/69 |
| 6,121,873 | A * | 9/2000 | Yamada et al. | 340/440 |
| 8,364,345 | B2 * | 1/2013 | Oida et al. | 701/37 |
| 2001/0003805 | A1 * | 6/2001 | Koibuchi | 701/9 |
| 2001/0007965 | A1 * | 7/2001 | Yokoyama et al. | 701/70 |
| 2002/0014799 | A1 * | 2/2002 | Nagae | 303/139 |
| 2009/0005942 | A1 | 1/2009 | Wiencek et al. | |
| 2009/0076682 | A1 * | 3/2009 | Ghoneim | 701/36 |
| 2009/0099727 | A1 * | 4/2009 | Ghoneim | 701/36 |
| 2009/0177346 | A1 * | 7/2009 | Hac | 701/29 |
| 2010/0222960 | A1 * | 9/2010 | Oida et al. | 701/29 |

FOREIGN PATENT DOCUMENTS

| | | |
|---|---|---|
| JP | 10-272955 | 10/1998 |
| JP | 2004-257435 | 9/2004 |
| JP | 2008-168733 | 7/2008 |

* cited by examiner

*Primary Examiner* — Bhavesh V Amin
(74) *Attorney, Agent, or Firm* — Finnegan, Henderson, Farabow, Garrett & Dunner, LLP

(57) ABSTRACT

A vehicle control system configured to judge a vehicle behavior or a driving preference of a driver based on acceleration of the vehicle including at least longitudinal acceleration. An acceleration value used in the judgment is obtained on the basis of a weighted detection value of the actual longitudinal acceleration of the vehicle, and a weighted parameter which is varied by an operation to increase a driving force of the vehicle executed by the driver. A weight on the parameter is reduced in case a weight on the detection value of the longitudinal acceleration is increased, and the weight on the parameter is increased in case the weight on the detection value of the longitudinal acceleration is reduced.

4 Claims, 6 Drawing Sheets

VEHICLE CONTROL SYSTEM

CROSS-REFERENCE TO RELATED APPLICATIONS

This application is a national phase application of International Application No. PCT/JP2011/066424, filed Jul. 20, 2011, the content of which is incorporated herein by reference.

TECHNICAL FIELD

The present invention relates to a control system for a vehicle, which is configured to adjust a characteristic of a control for controlling a behavior of the vehicle, or to judge a driving preference of a driver (i.e., driver's disposition or intension).

BACKGROUND ART

Basically, a characteristic of a control of driving force, speed change, steering or suspension is set to a predetermined characteristic. However, a driver of a vehicle changes occasionally, and driving environments such as a type of a road, a road surface condition and so on are varied widely while driving the vehicle. Therefore, it is preferable to change driving characteristics of a vehicle according to the driver's need. For this purpose, according to a conventional control system, the driving characteristic of the vehicle is changed by manually shifting a torque characteristic to a higher torque characteristic, or by changing a speed change map for controlling an automatic transmission. For example, the conventional control systems are configured to select a drive mode of the vehicle from a sporty mode where an agility of behavior of the vehicle is enhanced, a normal mode where the behavior of the vehicle is moderated in comparison with the sporty mode, and an economy mode where fuel economy is improved. However, each time the driver shifts the drive mode, the driver is required to operate a switch to select the driving mode. Such switching operation may bother the driver, and the shifting operation of the drive mode may be delayed by thus operating the switch.

In order to solve the above-explained disadvantages, according to the prior art, an intention of the driver has been attempted to be reflected on a vehicle control by judging the intention of the driver from a behavior of the vehicle. For example, Japanese Patent Laid-Open No. 10-272955 discloses a control system configured to calculate a sporty degree on the basis of lateral acceleration, a steering wheel angular velocity, a throttle opening, and a throttle opening/closing speed.

Meanwhile, Japanese Patent Laid-Open No. 2009-530166 discloses a control apparatus configured to judge a driving style of a driver. For this purpose, the control apparatus taught by Japanese Patent Laid-Open No. 2009-530166 is configured to calculate a so called "surface utilization" by weighting lateral acceleration and longitudinal acceleration individually to normalize those accelerations, and calculating the surface utilization on the basis of the normalized lateral acceleration and longitudinal acceleration. According to the teachings of Japanese Patent Laid-Open No. 2009-530166, such normalization is carried out to obtain a ratio of a detected acceleration to the maximum acceleration. Specifically, the surface utilization indicates a range of the longitudinal and lateral acceleration in which the vehicle may operate safely, and the surface utilization is obtained by squaring the normalized accelerations and adding together, and by obtaining a square root of the sum of those accelerations. Thus, according to the teachings of Japanese Patent Laid-Open No. 2009-530166, the surface utilization indicates a utilization of the area in which the vehicle may operate safely, that is, the driving style is indicated by the surface utilization.

Further, Japanese Patent Laid-Open No. 2004-257435 discloses a control device configured to determine sports driving intention of a driver. For this purpose, the control device taught by Japanese Patent Laid-Open No. 2004-257435 is configured to change a speed change schedule, in case a vehicle acceleration integrated value of exceeds a reference value and an existence of the sports driving intention is thereby judged.

In addition, according to the teachings of Japanese Patent Laid-Open No. 2004-257435, a determination of an existence of the sports driving intention is facilitated by reducing the reference value, in case a running resistance is large. Further, Japanese Patent Laid-Open No. 2007-536479 discloses another method for controlling a transmission by carrying out the weighting. Specifically, the method taught by Japanese Patent Laid-Open No. 2007-536479 is configured to optimize a shifting process depending on a type of a vehicle and a driving condition. For this purpose, according to the teachings of Japanese Patent Laid-Open No. 2007-536479, an input variable influencing the shifting operation is normalized and weighted.

Basically, the driving condition of the vehicle is changed depending on a driving environment such as a road condition, and also changed by an execution of unexpected operation out of the driver's habit. In addition, the driving condition of the vehicle is also changed by a temporal operation for avoiding some sort of obstacle. However, according to the teachings of Japanese Patent Laid-Open No. 10-272955, the control system is configured to calculate the sporty degree while reflecting the above-mentioned driving environment and specific factors. Therefore, the sporty degree may not be calculated accurately.

As described, the control apparatus taught by Japanese Patent Laid-Open No. 2009-530166 is configured to carry out the weighting to obtain a ratio of the detected acceleration to the maximum acceleration. That is, in case the detected acceleration is deviated from the driver's intention by a driving condition of the vehicle, or in case a relation therebetween is being changed according to the driving condition of the vehicle, the driving style may not be judged accurately.

As also described, the control device taught by Japanese Patent Laid-Open No. 2004-257435 is configured to change the reference value for determining the sports driving intention according to the running resistance. Therefore, in case the running resistance is changed irrespective of manual operations, the determination of the sports driving intention may be satisfied or dissatisfied alternately by such change in the running resistance. In this case, control content may be altered by such alternation of the judgment, and as a result, the speed change schedule may be changed without carrying out any specific manual operation. Therefore, the driver may feel uncomfortable feeling. That is, although the control device is configured to reflect the driver's intention on the driving condition, the control device thus configured may change the driving condition of the vehicle regardless of the driver's intention.

DISCLOSURE OF THE INVENTION

The present invention has been conceived noting the technical problems thus far described, and its object is to provide a vehicle control system capable of judging a driving preference of a driver accurately, and adjusting a control characteristic of the vehicle in line with the driver's intention.

In order to achieve the above-mentioned object, according to the present invention, there is provided a vehicle control system, which is configured to judge a vehicle behavior or a driving preference of a driver based on acceleration of the vehicle including at least longitudinal acceleration. According to the vehicle control system of the present invention, an acceleration value used to judge the vehicle behavior or the driving preference is obtained on the basis of a weighted detection value of the actual longitudinal acceleration of the vehicle, and a weighted parameter which is varied by an operation to increase a driving force of the vehicle executed by the driver. A weight on the parameter is reduced in case a weight on the detection value of the longitudinal acceleration is increased, and the weight on the parameter is increased in case the weight on the detection value of the longitudinal acceleration is reduced.

Alternatively, the vehicle control system of the present invention may also be configured to change a control characteristic of the vehicle. Specifically, according to another aspect of the present invention, there is provided a vehicle control system, which is configured to control at least any one of characteristics of a speed change, a driving force, a steering and a suspension, on the basis of a detection value of longitudinal acceleration of a vehicle, and a parameter which is varied by an operation to increase the driving force of the vehicle executed by a driver. According to the vehicle control system thus structured, the detection value and the parameter are weighted individually. A weight on the parameter is reduced in case a weight on the detection value of the longitudinal acceleration is increased, and a weight on the parameter is increased in case a weight on the detection value of the longitudinal acceleration is reduced.

According to the present invention, the weight on the detection value of the longitudinal acceleration and the weight on the aforementioned parameter are varied in opposite manners depending on the situation. Specifically, the weight on the detection value of the longitudinal acceleration is increased under the situation in which the longitudinal acceleration is easy to be established, and the weight on the parameter is increased under the situation in which the longitudinal acceleration is difficult to be established.

More specifically, the situation in which the longitudinal acceleration is easy to be established includes a situation in which the vehicle is running at a low speed, and the situation in which the longitudinal acceleration is difficult to be established includes a situation in which the vehicle is running at a high speed. That is, the weight on the parameter is reduced and the weight on the detection value of the longitudinal acceleration is increased in case the vehicle is running at a low speed. To the contrary, the weight on the parameter is increased and the weight on the detection value of the longitudinal acceleration is reduced in case the vehicle is running at a high speed.

The aforementioned parameter includes: an opening rate of an accelerator; a ratio of the detection value of the longitudinal acceleration to a maximum longitudinal acceleration possible to be established at a moment when the longitudinal acceleration is detected; and a ratio of the longitudinal acceleration calculated on the basis of the opening degree of the accelerator to the maximum longitudinal acceleration possible to be established at a moment when the longitudinal acceleration is calculated.

In addition, the aforementioned parameter is normalized within a tire friction circle of the vehicle.

Thus, the vehicle control system according to the present invention is configured to obtain the acceleration value used to judge the vehicle behavior or the driving preference of the driver on the basis of the weighted detection value of the longitudinal acceleration of the vehicle, and the weighted parameter which is varied by an operation to increase the driving force of the vehicle executed by the driver. The weight on the parameter is reduced in case the weight on the detection value is increased, and the weight on the parameter is increased in case the weight on the detection value is reduced. Therefore, the driving preference of the driver and the behavior of the vehicle to be achieved can be judged accurately.

According to another aspect of the present invention, at least any one of the characteristics of the speed change, the driving force, the steering and the suspension is controlled on the basis of the weighted detection value of longitudinal acceleration and the weighted parameter varied by an operation to increase the driving force executed by a driver. In addition, the weight on the parameter is reduced in case the weight on the detection value is increased, and the weight on the parameter is increased in case the weight on the detection value is reduced. Therefore, the control characteristic can be adjusted in line with the intention of the driver.

As described, according to the present invention, the weight on the longitudinal acceleration is increased in case the vehicle is running at a high speed, in comparison with a case in which the vehicle is running at a low speed. Therefore, the intention of the driver or the behavior of the vehicle appears in the form of longitudinal acceleration can be judged accurately. For this reason, the control characteristics can be adjusted in accordance with the driver's intention more accurately.

As also described, the parameter obtained based on the operation to increase the driving force is normalized within a tire friction circle to be used to calculate the acceleration value for judgment. Therefore, the driving preference of the driver and the behavior of the vehicle can be judged more accurately.

BEST MODE FOR CARRYING OUT THE INVENTION

The present invention relates to a vehicle control system for judging a behavior of a vehicle or a driving preference of a driver appearing on the vehicle behavior. Specifically, the above-mentioned judgment is made on the basis of longitudinal acceleration of the vehicle or synthesized acceleration of the longitudinal acceleration and lateral acceleration, or on the basis of a parameter representing an operating amount of a device for controlling a driving force such as an opening degree of an accelerator. Such control for judging a condition of the vehicle on the basis of the synthesized acceleration including the longitudinal acceleration is known in the prior art, as disclosed in the above-explained Japanese Patent Laid-Open No. 2009-530166 for example. As another example, a control system to be explained hereinafter is configured to use the synthesized acceleration detected successively as an instant index, and to process the instant index to use the processed index in a judgment for judging the vehicle behavior or the driving preference (i.e., driver's disposition or intension).

Figure 4:
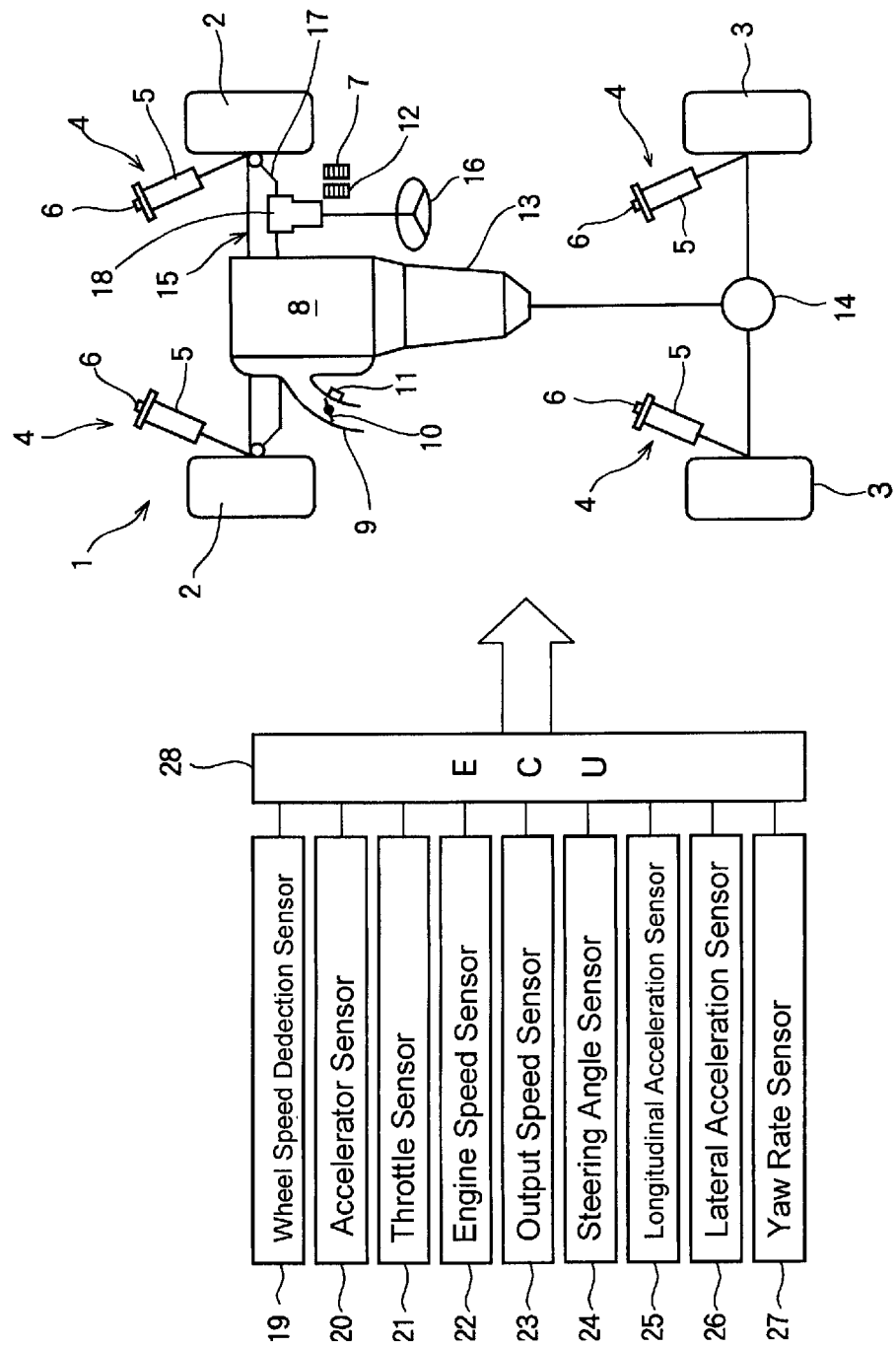
FIG. 4 is a view schematically showing a vehicle to which the present invention is applied.

For example, the vehicle control system according to the present invention may be applied to a vehicle 1 shown in FIG. 4. In the vehicle 1, an output of a prime mover such as an engine or a motor, a speed change operation for changing a speed and a driving force of the prime mover, a steering, and a suspension mechanism sustaining the vehicle and so on can be controlled electrically. As shown in FIG. 4, a vehicle 1 is provided with a pair of front wheels 2 and a pair of rear wheels 3. Specifically, each of the front wheel 2 serve as a steering wheel, and each of the rear wheel 3 serves as a driven wheel. Those wheels 2 and 3 are individually attached to a not shown vehicle body via a suspension 4. The suspension 4 is a conventional suspension mechanism composed mainly of a not shown spring and a shock absorber (i.e., a damper) 5. The shock absorber 5 shown in FIG. 4 is configured to absorb a shock utilizing a flow resistance of air or liquid, and the flow resistance therein can be increased and decreased by a motor 6 functioning as an actuator. For example, in case of increasing the flow resistance in the shock absorber 5, a hardness of the suspension 4 is enhanced so that the vehicle 1 becomes difficult to be depressed. As a result, the drive feeling of the vehicle 1 becomes much sporty rather than comfortable. In addition, a height of the vehicle 1 can be adjusted by adjusting pressurized air in the shock absorber 5.

Although not especially shown in FIG. 4, the front and rear wheels 2 and 3 are provided individually with a brake mechanism. Those brake mechanisms are actuated to apply braking force to the wheels 2 and 3 by depressing a brake pedal 7 arranged in a driver seat.

A conventional internal combustion engine, a motor, a combination of the engine and the motor and so on may be used as a prime mover of the vehicle 1, and in the example shown in FIG. 4, an internal combustion engine 8 is used as the prime mover. As shown in FIG. 4, a throttle valve 10 for controlling air intake is arranged in an intake pipe 9 of the engine 8. Specifically, the throttle valve 10 is an electronic throttle valve, which is opened and closed by an actuator 11 such as a motor controlled electrically. The actuator 11 is actuated in accordance with a depression of an accelerator pedal 12 arranged in the driver seat, that is, in accordance with an opening degree of an accelerator, thereby adjusting an opening degree of the throttle valve 10 to a predetermined angle.

A relation between an opening degree of the accelerator and an opening degree of the throttle valve 10 may be adjusted arbitrarily, and if a ratio of the opening degree of the accelerator to the opening degree of the throttle valve is approximately one to one, the throttle valve 10 reacts directly to the operation of the accelerator so that the sportiness of behavior of the vehicle 1 is enhanced. To the contrary, in case of reducing the opening degree of the throttle valve 10 relatively with respect to the opening degree of the accelerator, the behavior and the acceleration of the vehicle 1 is moderated. In case of using the motor as the prime mover, a current control device such as an inverter or a converter is used instead of the throttle valve 10. In this case, a relation between the opening degree of the accelerator and a current value, that is, characteristics of the behavior and the acceleration of the vehicle 1 are changed arbitrarily by adjusting the current in accordance with the opening degree of the accelerator by the current control device.

A transmission 13 is connected with an output side of the engine 8. The transmission 13 is configured to change a speed change ratio between an input speed and an output speed arbitrarily. For example, a conventional automatic geared transmission, a belt-type continuously variable transmission, a toroidal type transmission may be used in the vehicle 1. Specifically, the transmission 13 is provided with a not shown actuator, and configured to change the speed change ratio thereof stepwise or continuously by controlling the actuator. Basically, the transmission 13 is controlled to optimize the speed change ratio to improve fuel economy. For this purpose, a speed change map for determining the speed change ratio according to a speed of the vehicle 1 and the opening degree of the accelerator is prepared in advance, and the speed change operation of the transmission 13 is carried out with reference to the map. Alternatively, the speed change ratio of the transmission 13 is optimized by calculating a target output on the basis of the speed of the vehicle 1 and the opening degree of the accelerator, calculating a target engine speed on the basis of the calculated target output and an optimum fuel curve, and carrying out a speed change operation to achieve the obtained target engine speed.

A driving mode of the vehicle 1 to which the control system according to the present invention is applied can be selected from a fuel saving mode for reducing fuel consumption and a power mode for increasing a driving force. Specifically, under the fuel saving mode, an upshifting is carried out at relatively low speed, and the speed change ratio is kept to a relatively small ratio even in case the vehicle is driven at low speed. To the contrary, under the power mode, the upshifting is carried out at relatively high speed, and the speed change ratio is kept to a relatively large ratio even in case the vehicle is driven at high speed thereby increasing the driving force and enhancing acceleration. Those speed controls are carried out by switching the speed change map while correcting the drive demand or the calculated speed change ratio. In addition, a transmission mechanism such as a torque converter having a lockup clutch may be arranged between the engine 8 and the transmission 13 according to need. An output shaft of the transmission 13 is connected with the rear wheels 3 via a differential gear 14 used as a final reducing mechanism.

Next, here will be explained a steering mechanism 15 for changing an orientation of the front wheels 2. The steering mechanism 15 comprises: a steering wheel 16; a steering linkage 17 configured to transmit a rotation of the steering wheel 16 to the front wheels 2; and an assist mechanism 18 configured to assist a steering angle and a steering force of the steering wheel 16. The assist mechanism 18 is provided with a not shown actuator, and configured to control an assisting amount of the actuator. Therefore, a ratio of the steering force or angle of the steering wheel 16 to an actual steering force or angle of the front wheels 2 can be approximated to one to one by reducing the assisting force of the assist mechanism 18. As a result, the front wheels 2 can be turned directly in response to the rotation of the steering wheel 16 so that the sportiness of behavior of the vehicle 1 is enhanced.

Although not especially shown, in order to stabilize a behavior and attitude of the vehicle 1, the vehicle 1 is further provided with an antilock brake system (abbreviated as ABS), a traction control system, and a vehicle stability control system (abbreviated as VSC) for controlling those systems integrally. Those systems are known in the art, and adapted to stabilize the behavior of the vehicle 1 by preventing a locking and slippage of the wheels 2 and 3. For this purpose, those systems are configured to control a braking force applied to the wheels 2 and 3 on the basis of a deviation between a vehicle speed and a wheel speed while controlling the engine torque. In addition, the vehicle 1 may be provided with a navigation system for obtaining data on road information and a contemplated route (i.e., data on driving environment), and a mode selecting switch for selecting a drive mode manually from a sporty mode, a normal mode, an energy saving mode (i.e., economy mode) and so on. Further, a 4-wheel-drive mechanism (4WD) configured to change the driving characteristics such as a hill-climbing ability, acceleration, a turning ability and so on may be arranged in the vehicle 1.

In order to obtain data for controlling the engine 8, the transmission 13, the shock absorber 5 of the suspension 4, the assist mechanism 18, and the above-explained not shown systems, various kinds of sensors are arranged in the vehicle 1. For example, a wheel speed detection sensor 19 adapted to detect a rotational speed of each wheel 2 and 3, an accelerator sensor 20 adapted to detect an opening degree of the accelerator, a throttle sensor 21 adapted to detect an opening degree of the throttle valve 10, an engine speed sensor 22 adapted to detect a speed of the engine 8, an output speed sensor 23 adapted to detect an output speed of the transmission 13, a steering angle sensor 24, a longitudinal acceleration sensor 25 adapted to detect the longitudinal acceleration (Gx), a lateral acceleration sensor 26 adapted to detect the lateral (or transverse) acceleration (Gy), a yaw rate sensor 27 and so on are arranged in the vehicle 1. Here, acceleration sensors used in the above-explained behavior control systems such as the antilock brake system (ABS) and a vehicle stability control system (VSC) may be used as the acceleration sensors 25 and 26, and if an air-bag is arranged in the vehicle 1, acceleration sensors for controlling an actuation of the air-bag may also be used as the acceleration sensors 25 and 26. Detection signals (i.e., data) of those sensors 19 to 27 are transmitted to an electronic control unit (abbreviated as ECU) 28. The ECU 28 is configured to carry out a calculation on the basis of the data inputted thereto and data and programs stored in advance, and to output a calculation result to the above-explained systems or the actuators thereof in the form of a control command signal.

The synthesized acceleration of the vehicle, that is, an instant index (as will be called an "instant SPI" hereinafter) can be calculated on the basis of the longitudinal acceleration Gx and the lateral acceleration Gy using the following formula:

Instant SPI=$(Gx^2+Gy^2)^{1/2}$.

The longitudinal acceleration Gx includes acceleration resulting from increasing the driving force by depressing the accelerator pedal 12, and deceleration resulting from increasing the braking force by depressing the brake pedal 7. Thus, the deceleration is changed according to a depressing force for depressing the brake pedal 12. However, as described, the opening degree of the accelerator is electrically converted into the opening degree of the throttle valve. Therefore, although the acceleration is increased by depressing the accelerator pedal to increase the engine output, degree of acceleration is changed depending on a characteristic of the output control, that is, depending on a relation between the opening degree of the accelerator and the opening degree of the throttle valve or the engine torque. In addition, since the driving force is also changed by the speed change ratio, degree of acceleration is also changed depending on the characteristic of the speed change control. Further, when the vehicle is running, the steering operation is carried out not only in case of changing a travelling direction but also in various situations, e.g., in case of avoiding an obstacle or a bump on the road surface. That is, the longitudinal acceleration Gx and the lateral acceleration Gy are varied not only by an intentional operation to change the driving condition but also by a temporal operation to avoid a danger, regardless of the driver's intention to maintain the current driving condition.

Figure 5:
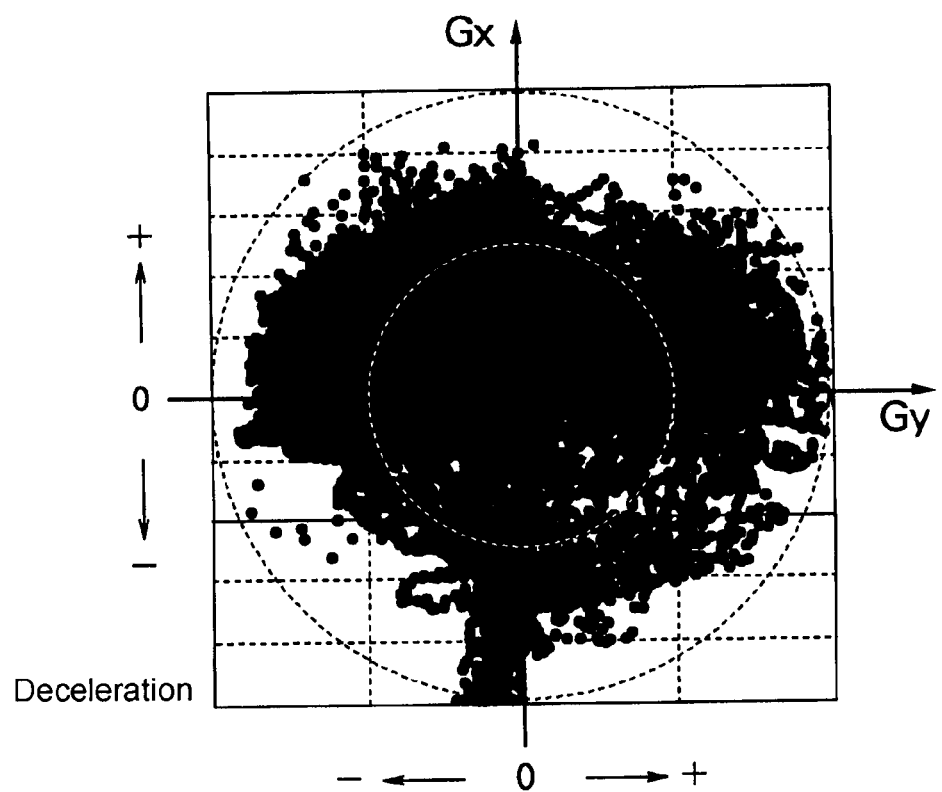
FIG. 5 is a friction circle plotting detected value of longitudinal acceleration and lateral acceleration.
Figure 6:
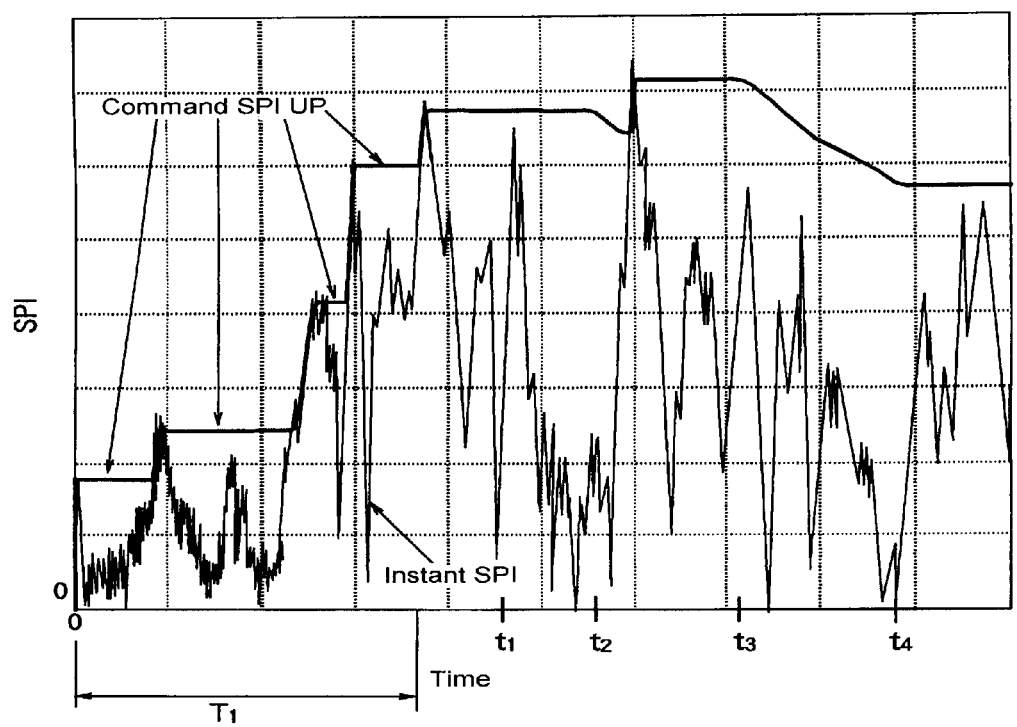
FIG. 6 is a graph indicating an example of a change in the command SPI according to a change in an instant SPI.

Therefore, in order to judge an essential behavior of the vehicle or the intention of the driver accurately while removing disturbance such as a temporal change in the acceleration, it is preferable to obtain a command index for judging the vehicle behavior and the driver's intention (corresponding to the acceleration value for judgment of the present invention) by processing the instant SPI. An example of obtain the command index will be explained hereinafter. FIG. 5 is a friction circle plotting the longitudinal acceleration Gx and the lateral acceleration Gy or the synthesized acceleration of Gx and Gy collected by driving the vehicle. The instant SPI is calculated based on the accelerations Gx and Gy constantly. An example of a change in the instant SPI is indicated in FIG. 6.

The instant SPI is so-called a sensor value obtained by differentiating an acceleration value detected by the acceleration sensor, or by differentiating a detection value of the speed sensor. Therefore, the instant SPI may not be stabilized and always fluctuating instantaneously. As described, such fluctuation of the instant SPI is caused by some sort of factors regardless of the driver's intention. Therefore, the command index for judgment (as will be called a command SPI hereinafter) is set to a local maximum value of the instant SPI, and held until the instant SPI is increased to the larger local maximum value (than the command SPI being held). When the instant SPI is thus increased to the larger local maximum value, the command SPI is updated to the larger local maximum value of the instant SPI and held again. The command SPI thus being held is lowered in case the instant SPI fluctuating below the local maximum value thereof satisfies a predetermined condition. The command SPI thus determined is indicated by a heavy line in FIG. 6. Specifically, the command SPI is an index to be used in a control for changing a characteristic of the vehicle behavior, and the command SPI calculated based on the instant SPI is increased immediately with an increase of the instant SPI, but lowered after a delay with respect to a drop of the instant SPI. As described, the command SPI is lowered based on a satisfaction of a specific condition. Specifically, the instant SPI shown in FIG. 6 corresponds to the plotted values indicated in FIG. 5. Meanwhile, the command SPI is set on the basis of the local maximum value of the instant SPI, and the command SPI is maintained until a satisfaction of a predetermined condition. Thus, the command SPI is increased promptly but lowered relatively slower.

Specifically, during a period T1 from a commencement of the control, the instant SPI based on the acceleration of the vehicle is fluctuated according to a change in the acceleration. As shown in FIG. 6, the instant SPI being fluctuated is increased locally to a maximum value prior to a satisfaction of the predetermined condition to update the command SPI. In this situation, the command SPI is set on the basis of each local maximum value of the instant SPI. Therefore, the command SPI is increased stepwise during the period T1. Then, when the condition to lower the command SPI is satisfied at a time point t2 or t3, the command SPI is started to be lowered. That is, the command SPI is lowered in case that maintaining the previous large value of the command SPI is presumed not to be preferable. Specifically, according to the present invention, such condition to lower the command SPI is satisfied according to elapsed time.

More specifically, the above-mentioned condition in which "maintaining the previous large value of the commands SPI is presumed not to be preferable" is a situation in which a divergence between the command SPI being maintained to the current value and the current instant SPI is relatively large and such divergence between those indexes is being continued. That is, the command SPI will not be lowered even if the instant SPI is lowered by an unintentional deceleration. For example, the command SPI will not be lowered in case the accelerator pedal is returned temporarily by a habit of the driver, or to maintain the vehicle speed after accelerating the vehicle. Meanwhile, in case the instant SPI is fluctuating below the command SPI for a certain period of time, the aforementioned condition to lower the command SPI is satisfied. Thus, the length of time in which the instant SPI stays below the command SPI may be used as the condition to lower the command SPI. In order to reflect the actual driving condition of the vehicle more accurately on the command SPI, a temporal integration (or accumulation) of the deviation between the command SPI being maintained and the instant SPI may be used as the condition to lower the command SPI. In this case, the command SPI is lowered when the temporal integration of the deviation between those indexes reaches a predetermined threshold. For this purpose, this threshold may be determined arbitrarily on the basis of a driving test or simulation. In case of using the temporal integration as the condition to lower the command SPI, the command SPI is to be lowered taking into consideration a duration time of the divergence of the instant SPI from the command SPI, in addition to the deviation between the command SPI and the instant SPI. Therefore, in this case, the actual driving condition or behavior of the vehicle can be reflected on the control to change the vehicle behavior more accurately.

In the example shown in FIG. 6, a length of time to maintain the command SPI before the time point t2 is longer than a length of time to maintain the command SPI before the time point t3. Those lengths of times to maintain the command SPI are determined by a control to be explained hereinafter. Specifically, as indicated in FIG. 6, the command SPI is increased to a predetermined value at the end of the aforementioned period T1 and maintained. In this situation, the instant SPI rises instantaneously at the time point t1, before the condition to lower the command SPI is to be satisfied at the time point t2. Therefore, the deviation between the command SPI and the instant SPI in this situation is smaller than a predetermined value, and the command SPI is therefore maintained to the time point t2. Here, this predetermined value to lower the command SPI may be determined arbitrarily on the basis of a driving test or simulation while taking into consideration a calculation error of the instant SPI. In case the instant SPI is thus raised close to the command SPI, this means that the actual driving condition of the vehicle is similar to the accelerating and turning conditions upon which the current command SPI being maintained is based. That is, although a certain period of time has elapsed from the time point at which the current commend SPI being held was set, the actual driving condition of the vehicle is still similar to the condition at the time point when the current command SPI being maintained was set. Therefore, in this situation, a commencement to lower the command SPI is delayed even if the instant SPI is fluctuating below the current command SPI being maintained. For example, the commencement to lower the command SPI can be delayed by resetting the elapsed time (i.e., accumulation time) or the integral of deviation from the time point at which the current command SPI was set, and restarting the accumulation of the elapsed time or the integration of the deviation. Alternatively, the commencement to lower the command SPI may also be delayed by subtracting a predetermined value from the elapsed time of the command SPI or the integral of deviation between the indexes, or interrupting the accumulation of the elapsed time or the integration of the deviation for a predetermined period of time.

Figure 7:
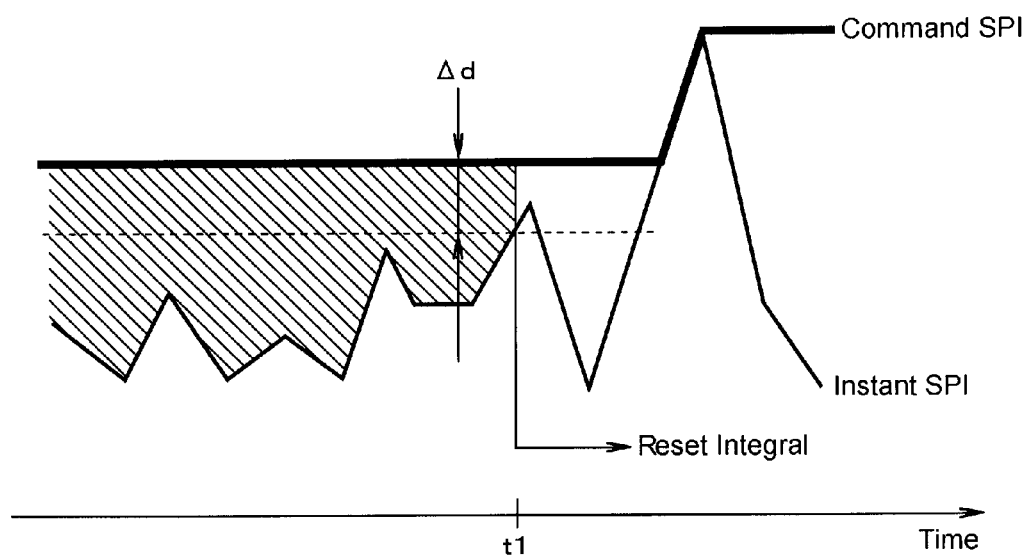
FIG. 7 is a graph indicating the integral of the deviation between the command SPI and the instant SPI, and a reset of the integral.

FIG. 7 is a graph indicating the aforementioned integral of the deviation between the command SPI and the instant SPI, and the reset of the integral. In FIG. 7, a shadowed area represents the integral of the deviation between the command SPI and the instant SPI. In the example indicated in FIG. 7, the reset of the integral of the deviation is executed at a time point t1 at which the divergence between the command SPI and the instant SPI becomes smaller than a predetermined value $\Delta d$, and the integration of the deviation between those indexes is restarted from the time point t1. Consequently, even if the current command SPI has been maintained for long time, the condition to lower the command SPI is prevented from being satisfied at the time point t1 so that the command SPI is maintained to the previous value. Then, when the instant SPI exceeds the command SPI after restarting the integration of the deviation between those indexes, the command SPI is updated to the local maximum value of the instant SPI and maintained again.

In addition, in the example shown in FIG. 6, the command SPI is maintained to a constant value after the time point t4. This is because an unexpected situation is excluded from being considered as a change in the driving condition, after the time point t4. Specifically, the unexpected situation can be exemplified by an execution of a temporal decelerating or steering operation to avoid a road obstacle. The instant SPI is lowered significantly by such a temporal operation. However, such depression of the instant SPI is only a temporal change and it should not be considered as a demand of the driver to change the characteristic of the vehicle behavior. Therefore, in case such a temporal operation is carried out, it is rather preferable to maintain the current characteristic of the vehicle behavior to achieve a drive feeling expected by the driver.

In case of carrying out the operation to increase the driving force, for example, in case of depressing the accelerator pedal 12, degree of the generated longitudinal acceleration may be different depending on a driving condition such as a vehicle speed ad a road gradient. Specifically, in case of accelerating the vehicle running by opening the accelerator slightly, that is, running at a low speed, an available driving force to the maximum capacity (i.e., an available capacity) is large and the running resistance is small. In this case, therefore, high longitudinal acceleration can be established by depressing the accelerator pedal 12. To the contrary, in case of accelerating the vehicle driven at a high speed by depressing the accelerator pedal 12 deeply, the available capacity of the driving force is small and the running resistance is high. In this case, therefore, the longitudinal acceleration established by depressing the accelerator pedal 12 is smaller in comparison with that of the case in which the vehicle is running at low speed. The same holds true for a road gradient. Specifically, in case the vehicle is climbing a hill where the gradient is large, the longitudinal acceleration established by depressing the accelerator pedal 12 is reduced in comparison with that of the case in which the vehicle is running on a flat road. According to the present invention, the vehicle control system is configured to obtain the acceleration value for judgment taking into consideration such a change in the longitudinal acceleration depending on the driving condition. Specifically, the vehicle control system is configured to obtain the acceleration value for judgment by weighting the detection value of the longitudinal acceleration, and a weight on the detection value of the longitudinal acceleration is differentiated depending on a case in which the longitudinal acceleration is easy to be established, and a case in which the longitudinal acceleration is difficult to be established.

In the example explained with reference to FIGS. 5 to 7, the acceleration value, that is, the command SPI is calculated based on the instant SPI as a synthesized acceleration including a detection value of the longitudinal acceleration. The command SPI thus calculated is used to judge the driving preference of the driver, or to calculate a judgment value for judging the vehicle behavior. Likewise, the control apparatus taught by Japanese Patent Laid-Open No. 2009-530166 is configured to calculate the "surface utilization" using the normalized longitudinal acceleration. According to the present invention, the vehicle control system is configured to weight (or correct) a detection value of longitudinal acceleration Gx, and to obtain the synthesized acceleration using the weighted value (as will be tentatively called a calculation value) of the longitudinal acceleration Gx. The calculation value to be used to obtain the instant SPI can be obtained using the following formula:

$$Gx' = Kacc2(v) \cdot (\text{actual acceleration } Gx)(0 \leq Kacc2(v) \leq 1)$$

where Gx' represents the calculation value, Kacc2(v) represents a weighting factor (i.e., a correction factor). The weighting factor Kacc2(v) is determined in advance on the basis of a driving test or simulation. An example of the weighting factor Kacc2(v) is shown in FIG. 1.

Figure 1:
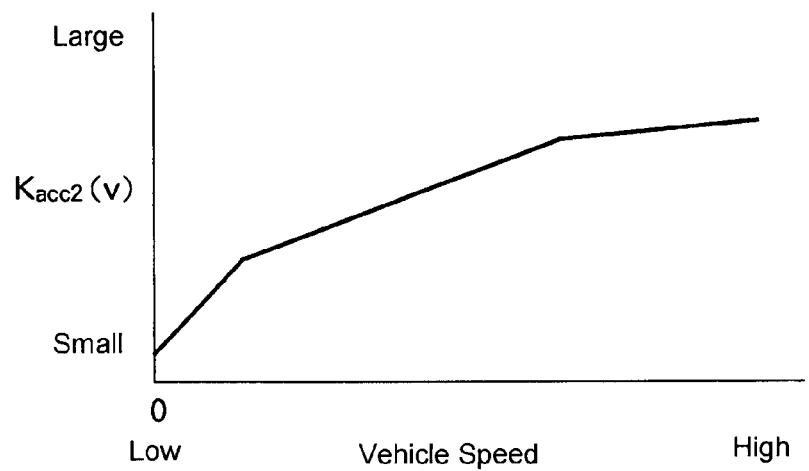
FIG. 1 is a graph indicating an example of a factor used for the weighting.

As indicated in FIG. 1, the weighting factor Kacc2(v) is increased according to an increase in a vehicle speed v. As described, the weighting factor Kacc2(v) may be obtained by carrying out a driving test or simulation in each speed or speed region. Therefore, the weighting factor Kacc2(v) may also be increased lineally or curved manner according to an increase in the vehicle speed, instead of being increased in a manner indicated by a polygonal line in FIG. 1. A reason to thus increase the weighting factor Kacc2(v) according to the vehicle speed will be explained hereinafter.

As described, in case the vehicle is running at a low speed, the running resistance such as an air resistance is smaller in comparison with that of the case in which the vehicle is running at a high speed, and the accelerator pedal is not depressed deeply (i.e., the throttle valve is not opened largely). In this case, therefore, an available driving force to the maximum capacity (i.e., to the maximum torque) is large. That is, the longitudinal acceleration can be established easily in this case. Therefore, in case the vehicle is running at a low speed, it is considered that the actual longitudinal acceleration Gx detected by the sensor or calculated based on the detection value represents the vehicle behavior or driver's intention (i.e., driving preference) relatively accurately. For this reason, the weighting factor Kacc2(v) is small in case the vehicle speed is low. To the contrary, in case the vehicle is running at a high speed, the running resistance such as the air resistance is larger in comparison with that of the case in which the vehicle is running at a low speed, and the accelerator pedal is depressed deeply (i.e., the throttle valve is opened largely). In this case, therefore, the available driving force to the maximum capacity (i.e., to the maximum torque) is small. That is, the longitudinal acceleration is difficult to be established in this case. Therefore, in case the vehicle is running at a high speed, it is considered that the actual longitudinal acceleration Gx detected by the sensor or calculated based on the detection value does not represent the vehicle behavior or driver's intention (i.e., driving preference) accurately. Therefore, the weighting factor Kacc2(v) of the case in which the vehicle speed is high is larger than that of the case in which the vehicle speed is low. Thus, according to the example shown in FIG. 1, the weighting factor Kacc2(v) to be applied on the actual longitudinal acceleration to judge (or estimate) the vehicle behavior or driving preference of the driver is reduced under the situation where the longitudinal acceleration is easy to be established. To the contrary, the weighting factor Kacc2(v) is increased under the situation where the longitudinal acceleration is difficult to be established.

Meanwhile, degree of the deceleration felt by the driver in case of braking the vehicle may be different depending on the vehicle speed. Therefore, the actual longitudinal acceleration Gx may also be corrected in case of breaking the vehicle. In case of braking the vehicle, the calculation value Gx' to be used to obtain the instant SPI can be calculated using the following formula:

$$Gx' = Kbrk \cdot (\text{actual acceleration } Gx)(0 < Kbrk < 1).$$

Figure 2:
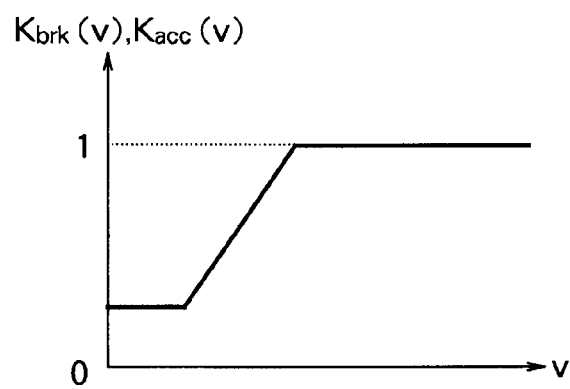
FIG. 2 is a graph indicating another example of a factor used for the weighting.

The factor Kbrk in the above formula may also be determined on the basis of a driving test or simulation. For example, as shown in FIG. 2, the factor Kbrk is increased according to an increase in the vehicle speed after the vehicle speed exceeds a predetermined value.

In case of applying the present invention to a system configured to judge the vehicle behavior or driving preference of the driver on the basis of the command SPI, the instant SPI is calculated using the following formula:

$$\text{Instant SPI} = \{Gx'^2 + (Ky \cdot Gy)^2\}^{1/2}$$

where Gy represents the lateral acceleration detected by the sensor or obtained based on a detection value, and Ky is a gain of the lateral acceleration Gy. Here, an influence of the longitudinal acceleration Gx to the vehicle behavior is different from that of the lateral acceleration Gy. Specifically, the lateral acceleration Gy appears on the vehicle behavior more prominently in comparison with the longitudinal acceleration Gx. Therefore, the lateral acceleration Gy is corrected by the gain Ky. For this purpose, the gain Ky is set to "0<Ky<1".

As explained with reference to FIGS. 6 and 7, the command SPI is calculated based on the instant SPI. The command SPI thus calculated represents the vehicle behavior at the moment when the driver executes an operation or immediately after the execution of the operation. In other words, the command SPI represents the driving preference of the driver. Therefore, it is considered that the command SPI itself represents a result of the judgment (or estimation) of the vehicle behavior and the driving preference of the driver. The vehicle behavior and the driving preference of the driver can be categorized into following modes such as a sporty mode in which the vehicle is turned and accelerated agilely, a mild mode in which the vehicle behavior is softened, and a normal mode in which the vehicle behavior is in between the sporty mode and the mild mode. Under each of the driving modes, different controls are required to adjust the driving characteristics of the vehicle. Therefore, after the vehicle behavior or the driving preference of the driver is judged as explained above, characteristics of chassis (including suspension), driving force, steering, speed change operation and so on are calculated and controlled on the basis of a judgment result (i.e., on the basis of the command SPI). Specifically, the characteristic of the chassis is determined mainly by the characteristic of the suspension sustaining the vehicle. For example, a hardness of the shock absorber 5 is enhanced and a vehicle height is lowered under the sporty mode. To the contrary, the hardness of the shock absorber 5 is reduced and the vehicle height is raised under the mild mode. In order to calculate the characteristic of the chassis, a control amount of the shock absorber 5 in accordance with the command SPI is determined in a map, and the control amount of the shock absorber 5 is calculated with reference to the map.

Next, a characteristic of the driving force will be explained hereinafter. The driving force is varied according to the output of the engine 8 and the speed change ratio set by the transmission 13. Therefore, the characteristic of the driving force can be adjusted arbitrarily by adjusting a relation between the opening degree of the accelerator and an opening degree of the throttle valve, and by adjusting the speed change ratio with respect to the opening degree of the accelerator and the vehicle speed. Specifically, under the sporty mode, the engine torque is increased substantially in proportion to an increase of the opening degree of the accelerator. Meanwhile, under the mild mode, the engine torque is reduced in comparison with the sporty mode. In addition, under the sporty mode, the speed change ratio is kept to a relatively large ratio even in case the vehicle is driven at high speed. To the contrary, under the mild mode, the speed change ratio is kept to a relatively small ratio in most of situations. Additionally, a characteristic of the steering will be explained for reference. Under the sporty mode, an amount to assist the steering by the actuator is reduced to enhance direct feeling. To the contrary, under the mild mode, the amount to assist the steering by the actuator is increased.

Here, the longitudinal acceleration of the vehicle is varied by operating the accelerator by the driver. That is, the operation of the accelerator and the longitudinal acceleration are related to each other. Therefore, in case of obtaining a calculation value of the longitudinal acceleration while weighting the longitudinal acceleration as described above, first of all, another parameter which is varied according to an accelerating or decelerating operation of the driver is weighted. Then, the calculation value $Gx'$ of the longitudinal acceleration $Gx$ is calculated using the calculation value of said another parameter thus obtained and the weighted value of the longitudinal acceleration. As a result, the instant SPI and the command SPI can be obtained while reflecting the vehicle behavior and the driving preference of the driver more accurately. Therefore, the vehicle behavior and the driving preference of the driver can be judged (or estimated) more accurately.

For example, a ratio of the actual longitudinal acceleration $Gx$ to a maximum acceleration $Gmax(v)$ (that is, an actual longitudinal acceleration rate) may be used as the aforementioned another parameter. Specifically, the maximum acceleration $Gmax(v)$ is the maximum acceleration possible to be established at the moment when the actual longitudinal acceleration $Gx$ is being established. The maximum acceleration $Gmax(v)$ can be obtained on the basis of: a maximum torque possible to be generated by the engine 8 (that is, the maximum torque generated by fully opening the accelerator), and gear ratios of the transmission 13 and a drive train at the moment when the actual longitudinal acceleration $Gx$ is being established; and a vehicle weight. Alternatively, the maximum acceleration $Gmax(v)$ may be determined in a map. In this case, specifically, the calculation value $Gx'$ of the longitudinal acceleration $Gx$ can be calculated using the following formula:

$$Gx'=Kacc(v)\cdot(Gx/Gmax(v))\cdot|\text{friction circle}|+(1-Kacc(v))\cdot Gx.$$

In the above formula, $Kacc$ is a weighting factor, and as described, the weighting factor $Kacc$ may be determined as shown in FIG. 2 by carrying out a driving test or simulation. Here, $Kacc$ and the aforementioned factor $Kbrk$ used in case of braking the vehicle are not necessarily identical to each other, and values of those factors are basically different from each other. Meanwhile, in the above formula, a term $(Gx/Gmax(v))$ is the actual longitudinal acceleration rate (that is, the ratio of the actual longitudinal acceleration $Gx$ to the maximum acceleration $Gmax(v)$). Further, in the above formula, |friction circle| is a term for normalizing the actual longitudinal acceleration rate within the friction circle of the vehicle. Specifically, a value to be substituted into the term |friction circle| is obtained by adapting a unit of a radius of a tire friction circle of the case in which the vehicle is running on a road where a friction coefficient μ is high, to a unit of the actual longitudinal acceleration $Gx$. For example, a value between 9.8 and 10.0 is substituted into the term |friction circle|. However, in case an engine capacity of the vehicle is small, a predetermined constant value may be substituted therein.

Thus, the instant SPI or the command SPI can be obtained using the calculation value $Gx'$ of the longitudinal acceleration $Gx$ calculated using the aforementioned another parameter varied according to the accelerating or decelerating operation of the driver. In this case, if the vehicle is running at a low speed so that the longitudinal acceleration is easy to be established, a weight on the actual longitudinal acceleration $Gx$ is increased, and a weight on the parameter varied according to the accelerating or decelerating operation of the driver is reduced. This is because the intention of the driver appears obviously on the behavior of the vehicle in this case. To the contrary, if the vehicle is running at a high speed so that the longitudinal acceleration is difficult to be established, the weight on the parameter varied according to the accelerating or decelerating operation of the driver is increased, and the weight on the actual longitudinal acceleration $Gx$ is reduced. This is because the intention of the driver does not appear obviously on the behavior of the vehicle in case the longitudinal acceleration is thus difficult to be established.

Alternatively, a target longitudinal acceleration rate may be used instead of the aforementioned actual longitudinal acceleration rate. Specifically, the target longitudinal acceleration rate is a ratio of a target longitudinal acceleration $Gx^*$ to the maximum acceleration $Gmax(v)$ possible to be established under the current situation $(Gx^*/Gmax(v))$. Basically, the target longitudinal acceleration $Gx^*$ is calculated based on the opening degree of the accelerator. Alternatively, the target longitudinal acceleration $Gx^*$ may also be calculated by: obtaining an opening factor of the accelerator according to the vehicle speed, on the basis of acceleration of a case in which an opening degree of the accelerator is constant, a minimum acceleration, a constant opening degree of the accelerator, and Weber fraction (i.e., a ratio according to Weber's low); and by calculating on the basis of the obtained opening factor of the accelerator, an opening degree of the accelerator, Weber fraction, and the minimum acceleration. Accordingly, in case of calculating the calculation value $Gx'$ of the longitudinal acceleration $Gx$ using the target longitudinal acceleration $Gx^*$, the calculation value $Gx'$ is calculated by the following formula:

$$Gx'=Kacc(v)\cdot(Gx^*/Gmax(v))\cdot|\text{friction circle}|+(1-Kacc(v))\cdot Gx.$$

The actual longitudinal acceleration $Gx$ and the target longitudinal acceleration $Gx^*$ are governed by an opening degree of the accelerator, and the maximum acceleration $Gmax(v)$ is established by fully opening the accelerator. Therefore, it is possible to substitute an opening rate of the accelerator for the aforementioned actual longitudinal acceleration rate and target longitudinal acceleration rate. Specifically, the opening rate of the accelerator is a percentage of an actual depressing amount of the accelerator pedal 12 provided that the opening degree of the accelerator of the case in which the accelerator pedal 12 is fully depressed is expressed as "100" or "8/8". In case of calculating the calculation value Gx' of the longitudinal acceleration Gx using the opening rate PA of the accelerator, the calculation value Gx' is calculated by the following formula:

$$Gx'=Kacc(v) \cdot PA \cdot |\text{friction circle}| + (1-Kacc(v)) \cdot Gx.$$

Thus, the calculation value Gx' of the longitudinal acceleration Gx can be calculated using the actual longitudinal acceleration rate, the target longitudinal acceleration rate, or the opening rate of the accelerator. In addition, the weight of any one of the longitudinal acceleration Gx and said another parameter varied according to the operation of the driver, on which the driver's intention appearing more obviously is increased. As a result, the intention of the driver can be reflected on the calculation value Gx' of the longitudinal acceleration Gx, or on the instant SPI or the command SPI more obviously. Therefore, the vehicle behavior and the driving preference of the driver can be judged more accurately taking into consideration not only the longitudinal acceleration of the vehicle but also the intention of the driver.

Figure 3:
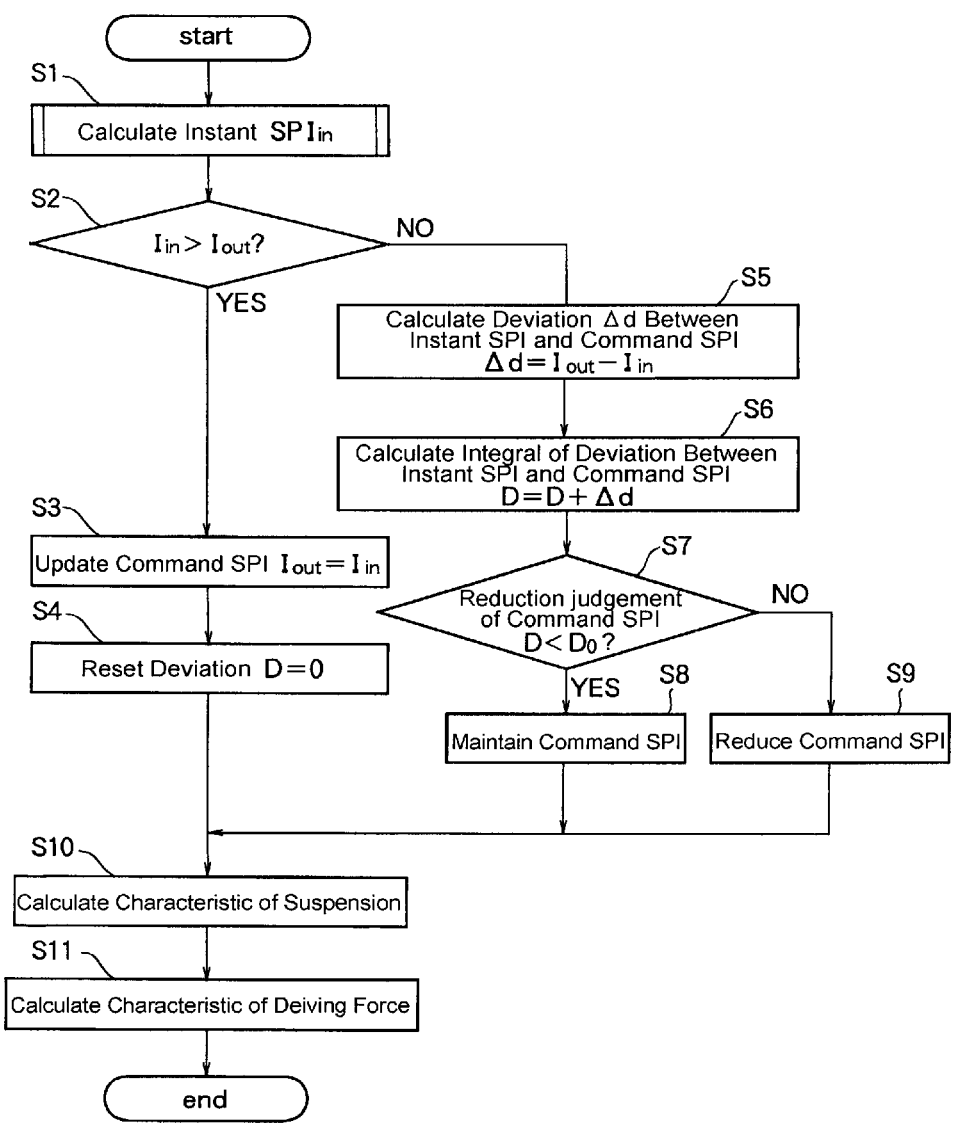
FIG. 3 is a flowchart explaining a control example to calculate a control characteristic using a command SPI as an acceleration value for judgment.

Next, here will be explained an example of judging the vehicle behavior and the driving preference of the driver using the command SPI, and setting a control characteristic on the basis of the command SPI. FIG. 3 is a flowchart explaining the above-mentioned control. First of all, a value $I_{in}$ of the instant SPI, that is, a synthesized acceleration (i.e., a synthesized G) is calculated (at step S1). As described, the instant SPI is calculated using the following formula:

$$\text{Instant SPI} = \{Gx^2 + (Ky \cdot Gy)^2\}^{1/2}$$

and the calculation value Gx' of the longitudinal acceleration Gx of the case in which the accelerator pedal 12 is depressed to accelerate the vehicle can be calculated using any of the following formulas:

$$Gx'=Kacc2(v) \cdot (\text{actual acceleration } Gx);$$

$$Gx'=Kacc(v) \cdot (Gx/G\max(v)) \cdot |\text{friction circle}| + (1-Kacc(v)) \cdot Gx;$$

$$Gx'=Kacc(v) \cdot (Gx^*/G\max(v)) \cdot |\text{friction circle}| + (1-Kacc(v)) \cdot Gx;$$

and $$Gx'=Kacc(v) \cdot PA \cdot |\text{friction circle}| + (1-Kacc(v)) \cdot Gx.$$

Then, the value $I_{in}$ is compared with a value $I_{out}$ of the command SPI being held (at step S2). In case the value $I_{in}$ of the instant SPI is larger than the value $I_{out}$ of the command SPI so that the answer of step S2 is YES, the value $I_{out}$ of the command SPI is updated to the value of the instant SPI as explained above (at step S3). During the period of maintaining the command SPI to the current value of $I_{out}$, a deviation between the $I_{in}$ and $I_{out}$ is accumulated. However, when the value $I_{out}$ of the command SPI is updated, a reset of an integral of the deviation D is executed (at step S4). Specifically, the integral of the deviation D is reset to 0.

$$D=0$$

To the contrary, in case the answer of step S2 is NO, that is, in case the value $I_{in}$ of the instant SPI is smaller than the value $I_{out}$ of the command SPI, a deviation Δd between the value $I_{out}$ of the command SPI and the value $I_{in}$ of the instant SPI is calculated (at step S5). Specifically, the deviation Δd is calculated using the following formula:

$$\Delta d = I_{out} - I_{in}.$$

Then, an integral of the deviation D between the value $I_{out}$ of the command SPI and the value of the instant SPI is calculated (at step S6) using the following formula:

$$D = D + \text{deviation } \Delta d.$$

Then, it is judged whether or not the integral of the deviation D between the value $I_{out}$ of the command SPI and the value of the instant SPI is smaller than a reduction starting threshold D0 set in advance (at step S7). Specifically, the reduction starting threshold D0 is used to determine a point of time to start lowering the value $I_{out}$ of the command SPI being maintained, in other words, the reduction starting threshold D0 is used to define a length of time for maintaining the current value of $I_{out}$ of the command SPI. Therefore, when the integral of the deviation D exceeds the reduction starting threshold D0, a judgment to start lowering the value $I_{out}$ of the command SPI is carried out.

In case the integral of the deviation D between the value $I_{out}$ of the command SPI and the value $I_{in}$ of the instant SPI is smaller than the reduction starting threshold D0 so that the answer of step S7 is YES, the value $I_{out}$ of the command SPI is maintained to the current value (at step S8). To the contrary, in case the integral of the deviation D between the value $I_{out}$ of the command SPI and the value $I_{in}$ of the instant SPI is larger than the reduction starting threshold D0 so that the answer of step S7 is NO, the routine advances to step S9 to lower the value $I_{out}$ of the command SPI. In order to reduce uncomfortable feeling of the driver, a manner to lower the value $I_{out}$ of the command SPI may be adjusted arbitrarily.

After the value $I_{out}$ of the command SPI is thus determined at step S4, S8 or S9, a characteristic of the chassis (i.e., a characteristic of the suspension) is calculated on the basis of the calculated value $I_{out}$ of the command SPI (at step S10), and then, a characteristic of the driving force is calculated on the basis of the calculated value $I_{out}$ of the command SPI (at step S11). The controls of setting those control characteristics are carried out as explained above. In addition to the suspension and the driving force, a characteristic of the steering may also be calculated and controlled on the basis of the calculated value $I_{out}$ of the command SPI.

The present invention may be applied not only to the system configured to judge the vehicle behavior and the driving preference based on the command SPI but also to the control apparatus taught by Japanese Patent Laid-Open No. 2009-530166 configured to judge a driving style of a driver by calculating the vehicle condition such as the surface utilization based on the longitudinal acceleration.

Thus, the vehicle control system according to the present invention is configured to carry out the above-explained controls using mainly the electronic control unit. That is, the vehicle control system of the present invention is configured to judge a vehicle behavior or a driving preference of a driver based on acceleration of the vehicle including at least longitudinal acceleration, and comprises following functional means for carrying out the above-explained controls. Specifically, the vehicle control system of the present invention comprises: a an acceleration calculating means, which is adapted to calculate an acceleration value used to judge the vehicle behavior or the driving preference on the basis of a weighted detection value of the actual longitudinal acceleration of the vehicle, and a weighted parameter which is varied by an operation to increase a driving force of the vehicle executed by the driver; and a weighting means, which is adapted to reduce a weight on the parameter in case a weight on the detection value of the longitudinal acceleration is increased, and to increase the weight on the parameter in case the weight on the detection value of the longitudinal acceleration is reduced.

According to another aspect of the present invention, the vehicle control system is configured to control at least any of characteristics of a speed change, a driving force, a steering and a suspension, on the basis of a detection value of longitudinal acceleration of a vehicle, and a parameter which is varied by an operation to increase the driving force of the vehicle executed by a driver. The vehicle control system thus structured comprises a weighting means which is adapted to weight the detection value and the parameter. Specifically, the weighting means is adapted to reduce a weight on the parameter in case a weight on the detection value of the longitudinal acceleration is increased, and to increase the weight on the parameter in case the weight on the detection value of the longitudinal acceleration is reduced.

The invention claimed is:

1. A vehicle control system, which is configured to calculate an acceleration value used to judge a vehicle behavior and to judge a driving preference of a driver based on the calculated acceleration value, comprising:
   a calculator that is configured to calculate the acceleration value on the basis of:
      a parameter including at least any one of:
         (i) a ratio of the actual longitudinal acceleration of the vehicle to a maximum longitudinal acceleration possible to be established at a moment when the longitudinal acceleration is calculated,
         (ii) a ratio of a depression amount of the accelerator pedal to establish the actual acceleration to a maximum depression amount of the accelerator pedal, and
         (iii) a ratio of a target longitudinal acceleration calculated based on the depression amount of the accelerator pedal to the maximum longitudinal acceleration possible to be established at a moment when the target longitudinal acceleration is calculated, and
      an actual longitudinal acceleration; and
   a corrector that is configured to:
      carry out a first correction when the longitudinal acceleration of the vehicle is easy to be established, wherein the first correction comprises:
         correcting the parameter by reducing the acceleration value to be smaller than the acceleration value when the longitudinal acceleration of the vehicle is difficult to be established, and
         correcting the actual longitudinal acceleration by increasing the acceleration value to be larger than the acceleration value when the longitudinal acceleration of the vehicle is difficult to be established; and
      carry out a second correction when the longitudinal acceleration of the vehicle is difficult to be established, wherein the second correction comprises:
         correcting the parameter by increasing the acceleration value to be larger than the acceleration value when the longitudinal acceleration of the vehicle is easy to be established, and
         correcting the actual longitudinal acceleration by reducing the acceleration value to be smaller than the acceleration value when the longitudinal acceleration of the vehicle is easy to be established.

2. The vehicle control system as claimed in claim 1, wherein
   the longitudinal acceleration of the vehicle is easy to be established when the vehicle speed is slower than a predetermined speed, and
   the longitudinal acceleration of the vehicle is difficult to be established when the vehicle speed is faster than a predetermined speed.

3. The vehicle control system as claimed in claim 1, further comprising:
   a controller that controls at least one of characteristics of a speed change, a driving force, a steering, and a suspension, based on the acceleration value.

4. The vehicle control system as claimed in claim 1, wherein the parameter is normalized within a tire friction circle of the vehicle.

* * * * *